(Model.)

G. F. SIMONDS.
INSERTIBLE SAW TOOTH.

No. 306,967. Patented Oct. 21, 1884.

Witnesses
H. S. Downe
H. B. Eaton

Inventor
Geo. F. Simonds
R. H. Evans
his atty.

UNITED STATES PATENT OFFICE.

GEORGE F. SIMONDS, OF FITCHBURG, MASSACHUSETTS.

INSERTIBLE SAW-TOOTH.

SPECIFICATION forming part of Letters Patent No. 306,967, dated October 21, 1884.

Application filed August 8, 1884. (Model.)

*To all whom it may concern:*

Be it known that I, GEO. F. SIMONDS, of Fitchburg, in the county of Worcester, in the State of Massachusetts, have invented certain Improvements in Saws; and I hereby declare the following to be a full, clear, and exact description of the same, reference being had to the accompanying drawings, making a part of this specification, in which—

Figure 1:
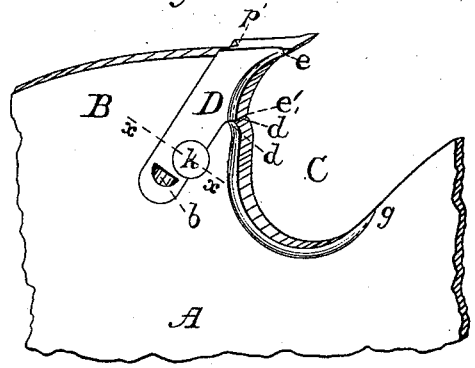
Figure 6:
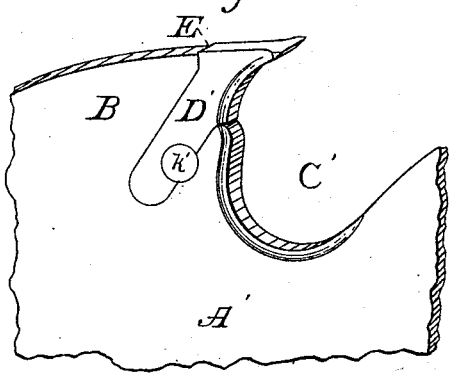
Figure 2:
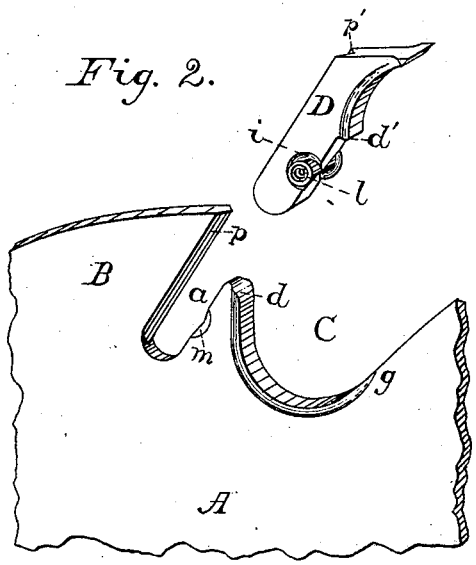
Figure 3:
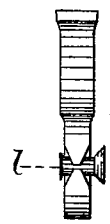
Figure 4:
Figure 5:

Figure 1 is a perspective view of a portion of a saw-plate with the improved points inserted in the tooth. Fig. 2 is a perspective view of a portion of a saw-plate with tooth and a point ready for insertion. Fig. 3 is a view of the improved point and attached rivet. Fig. 4 is a section on line $x\,x$ of Fig. 1. Fig. 5 is a section of the rivet. Fig. 6 is a modification of construction of the tooth and point.

Saws with changeable teeth or points may be classed under four heads, viz: first, those where the teeth entire are inserted into a saw-plate and fastened with a rivet or otherwise; second, those where the cutting-teeth or points are fastened into the saw in front of the teeth proper, or in the gullet, by means of levers, springs, wedges, rivets, &c., singly or combined; third, those where the cutting-points are inserted into inserted teeth; fourth, those where the cutting-points are inserted into the teeth proper, the teeth being integral with the saw-plate.

Saws of the first and second classes are now made that are reasonably successful in operation and sale; and points have been inserted in saw-teeth, but no saw so constructed has as yet made its way into popular public use, while the large number of patents recently issued on inserted-tooth saws show the demand for something practically more effective than those now in the market.

My invention relates to the fourth class of saws above named; and it consists in inserting in the teeth of saws points so small and inexpensive that it is economy to replace them with others as soon as the first swaging is worn away, and in a manner so compact and simple as to secure any required number of teeth in a saw.

It also consists in the details of construction and combination and arrangement of parts, as described, which enable the saws to stand the severe strain to which they are subjected in use, and reduces the cost of repairs to the minimum.

It further consists in providing the point to be inserted with an attached rivet adapted to secure the point in the saw-tooth, and at the same time avoid the necessity of handling the rivet itself, which consumes time and is annoying.

In order that those skilled in the art may make and use my invention, I will proceed to describe the manner in which I have carried it out.

In the said drawings, A is a saw-plate provided with tooth B and gullet C, after the ordinary manner of circular saws. In the point of the tooth is cut a recess, $a$, adapted to receive a removable point, D. The side lines of recess $a$ are cut at about an angle of thirty degrees to the radius of the saw. The longer edge of the plate on recess $a$ is beveled at $p$ to receive a beveled groove, $p'$, on the longer or back edge of the inserted point, after the manner used in such devices, while the opposite edge may be beveled in a similar manner, or left flat, as shown in drawings. The curved line $e\,e'$ of point D and $e'\,g$ of gullet C form a practically continuous curve for the dust to follow from the cutting point into the gullet of the saw. The shoulder $d$ is designed to give sufficient strength to that part of the tooth in front of the point D, and the point D is provided with a similar shoulder, $d'$, to prevent dust driving between the two and to insure the proper curve for the dust to follow. The point D rests solidly at the bottom of recess $a$, and it is not essential that the shoulders $d$ and $d'$ abut against each other. The cutting-edge of the point D is swaged or spread to the necessary width to insure a proper clearance to the saw-plate in the kerf. The front face of the point D between $e$ and $e'$ and of plate in gullet between $e'$ and $g$ are also spread, not as wide as the cutting-edge, but of substantially even thickness throughout and of sufficient width to form, with the sides of the kerf, a complete pocket for removing the dust from the log.

I prefer to secure the inserted point in the tooth by means of a rivet, which shall accompany and be attached to each particular tooth-point, so that the millman need not handle the rivet, except in connection with the point; or, in other words, the inserted point and fastening device constitute practically but one piece, in place of two or more. The inserted point is drilled, as seen at *i*, close to one edge. The cut of the hole *i* may extend through the edge of the point without materially affecting the invention. On each side of the inserted point the hole *i* is countersunk, as seen in Fig. 3. Through this hole is placed the rivet, which is preferably made hollow at smaller end, and this end is spread to a very slight degree, *l*, so that it will not come out of the hole *i*, but will play freely within said hole and roll or yield longitudinally while the point is being passed into the recess *a* in the tooth, the distance between the head of the rivet and the slightly-spread portion *l* being greater then the thickness of the saw-plate A.

At *m* the teeth of the saw-plate are countersunk of an equal depth to the countersinks in the hole *i* in the points on lines continuous with the circle of the countersinks in the inserted point. After the point has been inserted in the tooth the rivet is spread and upset firmly and securely, as shown in Figs. 1 and 4. The recess *b* in side of point D is for the insertion of a set to drive the point out of the tooth.

Fig. 6 shows the same construction of tooth and point as hereinbefore described, except shoulder E, made at about a right angle to a tangent of the circle of the saw, a form which I find at times desirable.

Having thus described my invention, what I claim as new, and desire to secure by Letters Patent, is—

1. The inserted point D, having face $e\ e'$ swaged broader than the body of the point, in combination with tooth B and plate A, provided with gullet C, having its face swaged broader than the thickness of the plate and coinciding with swaged face $e\ e'$, as set forth.

2. The inserted point D, provided with the rectangular shoulder E and swaged face $e\ e'$, as described, in combination with tooth B, provided with a recess, *a*, cut at an angle of about thirty degrees to the radius of the plate A, and gullet C, swaged to broaden its face, as described.

3. A removable or interchangeable portion of a saw, provided with an opening to receive and carry a fastening-rivet independent of the saw-plate, in combination with a rivet inserted and secured in said opening, and adapted to fasten said portion to a saw-plate, substantially as described.

4. The point D, provided with hole *i* close to its edge, and inserted rivet *k*, having the small end slightly spread, in combination with the saw-plate A, provided with the registering countersinks, as specified.

5. The point D, provided with recess *b* in the side of the body of the shank, as set forth.

GEO. F. SIMONDS.

Witnesses:
H. S. DOWNE,
H. B. EATON.